June 24, 1969　　　T. R. EDMONDS ETAL　　　3,451,289

PNEUMATIC GYROSCOPE

Filed March 4, 1966

INVENTORS.
THOMAS R. EDMONDS
RICHARD C. TURNBLADE
GERALD B. SPEEN

ATTORNEY

United States Patent Office 3,451,289
Patented June 24, 1969

3,451,289
PNEUMATIC GYROSCOPE
Thomas Rhys Edmonds, Woodland Hills, and Richard C. Turnblade and Gerald B. Speen, Northridge, Calif., assignors to International Telephone and Telegraph Corporation, Nutley, N.J., a corporation of Maryland
Filed Mar. 4, 1966, Ser. No. 531,708
Int. Cl. G01c *19/24*
U.S. Cl. 74—5.12                                                                10 Claims

ABSTRACT OF THE DISCLOSURE

A pneumatically operated gyroscope having a gas bearing supporting the rotor on a fixed support. The gas bearing is in the form of a blanket of gas having a predetermined minimum pressure. A portion of the body of gas which forms the gas bearing is channeled to the periphery of the rotor and exhausted through appropriate ports to effect rotation thereof. Additionally, gas emanating from such exhaust ports is utilized in conjunction with a pneumatic pickoff device to signal misalignment of the rotor in relation to an appropriate reference plane. Locking of the rotor against rotation is effected by mechanical means in response to a drop in pressure in the gas bearing below a predetermined minimum. Gas pressure in the gas bearing above a predetermined minimum retains the rotor in unlocked condition.

---

This invention relates to a gas lubricated gyroscope and more particularly to a gyroscope having a gas powered rotor supported upon a gas bearing.

Gyroscopes known in the art employ various couplings between the rotor and the mounting platform or support therefor—including gas lubricated bearings. Although the use of a gas bearing as a coupling between a gyroscope rotor and its support is not new, conventional configurations of same often depend upon the support structure entirely or in part to form the gas bearing geometry. In consequence, the lubrication mechanism is fixed with respect to the support and not with the rotor. The use of a gas to spin a gyroscope rotor is also known, but again often the spin producing mechanism is fixed with respect to the support rather than the rotor. These mechanism being fixed with respect to the support rather than the rotor can cause a torque to be exerted about the spin axis of the rotor and, hence, cause some undesirable random drift of the spin axis of the rotor. It would be a great advantage to provide a gyroscope designed to eliminate any coupling between the reference rotor and the mounting platform or support, and thus minimize or erase this random drift. As mentioned above, known gyroscopes employ gas bearings and gas driven rotors, but usually an additional class of energy is required to measure any change in orientation between the rotor and its support; for example, optical pickoffs are used as described hereinafter.

Accordingly, it is an object of this invention to provide a gyroscope designed to minimize or eliminate coupling caused by static friction between the reference rotor and the mounting platform or support therefor.

A further object of this invention is to provide an all pneumatic gyroscope.

It is another object of this invention to provide a gyroscope employing a pneumatic pickoff to sense misalignments.

Briefly, the invention provides a pneumatically operated gyroscope having a bearing support with an outer surface of spherical contour with ports disposed in the bearing support, and means to exhaust gas under pressure through the ports. The gyroscope further has a rotor which has a bearing surface also of spherical contour but of a radius slightly larger than the radius of the spherical surface of the bearing support. An improvement in the gyroscope is characterized in that the ports are arranged in two series only, each series lying in a plane normal to the axis of the bearing support, and in that the rotor has a channel separating its bearing surface into two areas, each of the areas being adapted to overlie one of the series of ports so that when gas flows from the ports, it spreads out into a thin strata between the opposed bearing surfaces escaping to the channel and along the sides of the rotor. The rotor further has means to exhaust gas from the channel in a manner to repel the rotor.

A feature of this invention is a pneumatic pickoff having dual inputs which is rigidly attached to a gyroscope case such that any misalignment between the rotor of the gyroscope and its case will cause a disproportionate amount of gas to enter the dual inputs, thus providing a measure of the amount of misalignment.

Another feature of this invention is a pneumatically operated caging mechanism which causes a caging ring to contact the rotor of a gyroscope and bring it to a stop when there is insufficient gas pressure because ample lubrication would no longer exist and damage to the gyroscope could occur.

The above-mentioned and other features and objects of this invention will become more apparent by reference to the following description taken in conjunction with the accompanying drawings, in which.

Figure 1:
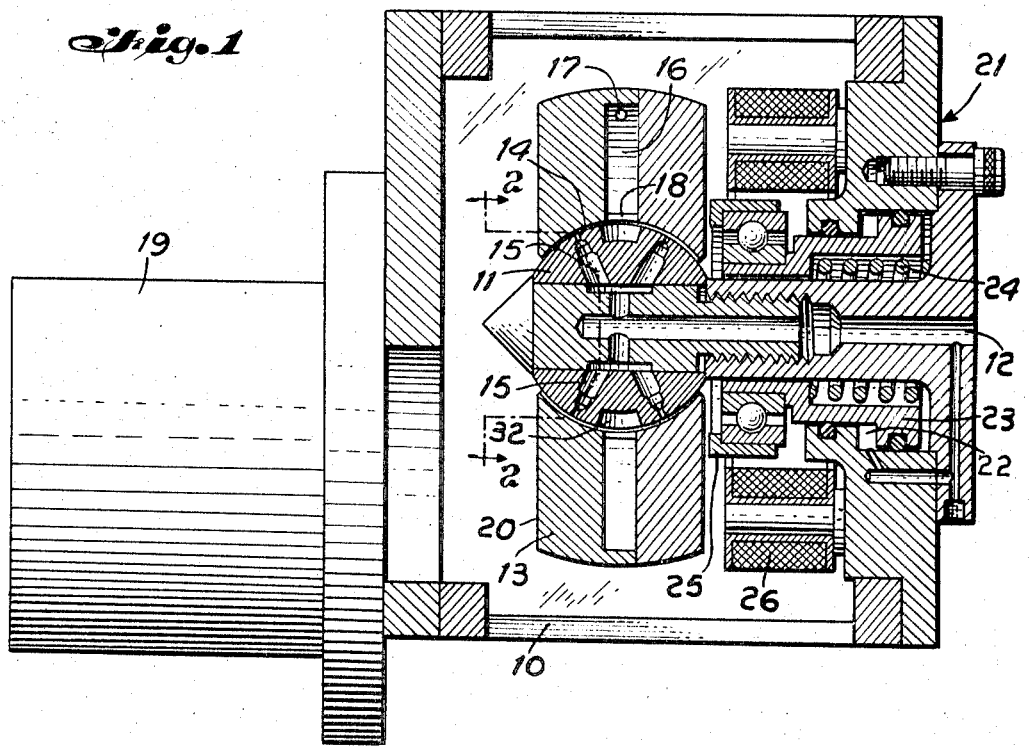
FIGURE 1 is a sectional view in elevation illustrating an embodiment of the invention.
Figure 2:
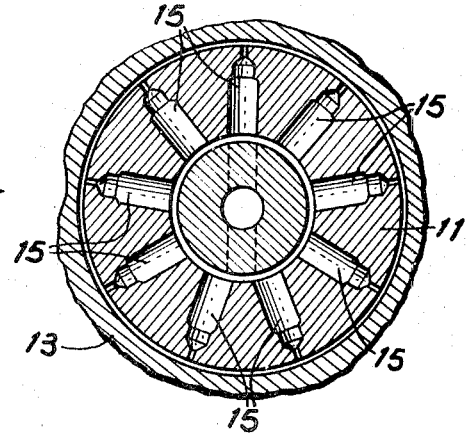
FIGURE 2 is a sectional view taken along line 2—2 of FIGURE 1.

FIGURES 1 and 2 illustrate a first embodiment of the gyroscope comprising an outer case 10, having coupled thereto a substantially spherical bearing support 11. Bearing support 11 is supplied with a high pressure gas at an intake 12 from an external air supply (not shown). Arranged about the support 11 is a rotor 13. The gas supplied to support 11 via intake 12 is distributed to the gas bearing gap 14 between support 11 and rotor 13 by way of radial supply ports 15. While as many as nine supply ports 15 are provided in each hemisphere of support 11, only three at each side would provide more than marginal performance. Supply ports 15 on each hemisphere of support 11 are arranged to exhaust air to gas bearing gap 14 along a single plane (FIGURE 2). Rotor 13 has a number of radial passageways 16 extending towards its outer periphery. These radial passageways are terminated in exhaust ports 17 at the periphery of rotor 13 to form reaction jets. Rotor 13 has a channel 18 separating the inner surface thereof into two areas forming one surface of gas bearing gap 14. As can be readily seen from FIG. 1, the channel 18 symmetrically separates the rotor into two separate areas of uniform configuration. The gas supplied to supply ports 15 escapes in two directions, first to the outside edge of rotor 13 through gas bearing gap 14, providing lubrication between the rotor and its support, and secondly to channel 18. The gas escaping to channel 18 leaves rotor 13 through reaction jets 17 thereby creating forces which spin rotor 13. Thus no physical contact exists during operation between support 11 and rotor 13. If desired a circumferential duct 32 about support 11 adjacent channel 18, may be provided to provide additional volume to handle the gas flowing toward the center of the rotor.

To indicate the position of rotor 13 with respect to support ball 11 or outer case 10, an optical pickoff 19 is shown connected to case 10. Optical pickoff 19 could, for example, include means to produce a light beam which is directed toward an edge of rotor 13 which edge could have a mirrored surface 20. The incident light beam would be reflected from mirrored surface 20 back to optical pickoff 19, such that the angular divergence of the reflection would be a measure of the angle between rotor 13 and outer case 10.

Another feature, illustrated in FIGURE 1, is a caging mechanism 21. It is of course obvious that a caging mechanism need not be employed with the illustrated gyroscope but is only a preferred accessory. Caging mechanism 21 is pneumatically operated and makes the gyroscope fail safe in the event of a power failure or loss of pressure from the gas supply. Basically, this is done by routing gas through a caging cylinder 22 and against piston 23 which, as long as sufficient pressure exists, is withdrawn leaving rotor 13 free to rotate. However, if there is a loss in pressure, the caging piston 23 will be forced to the left by spring 24 causing the caging ring 25 to contact the spinning rotor and bring it to a stop before the pressure drops to a point where gas lubrication would no longer exist. In this manner, the device is self-protective from violent stoppage because of loss of supply pressure.

Also shown in FIGURE 1 is a set of torquer coils 26 which torque rotor 13. With torquers, it is possible to precess rotor 13 at a preselected rate or to counter balance bias torques.

Figure 3:
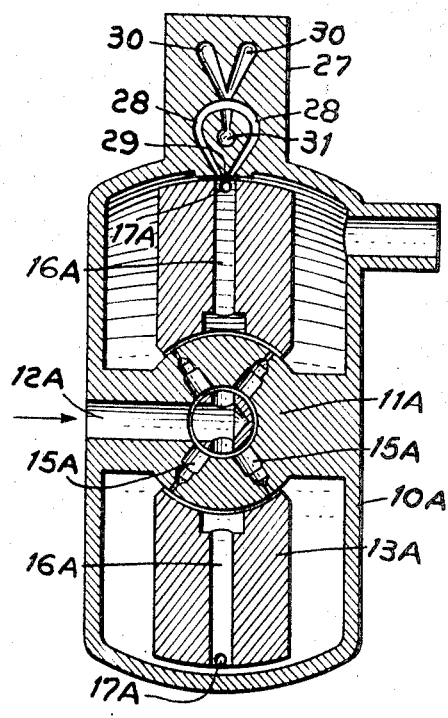
FIGURE 3 is a sketch in section illustrating an all pneumatic gyroscope according to the invention.

FIGURE 3 is a sketch illustrating an all pneumatically operated gyroscope, comprising a gyroscope case 10A having attached thereto a substantially spherical support structure 11A which includes an inlet 12A and a plurality of ports 15A. Surrounding support structure 11A is a rotor 13A which has a number of radial passageways 16A therein, the radial passageways being terminated in substantially tangential exhaust ports 17A. The basic gyroscope arrangement of FIGURE 3 is very similar to that hereinbefore described with respect to FIGURES 1 and 2. The primary difference is the addition of a pneumatic pickoff 27.

Pneumatic pickoff 27 includes a pair of control ports 28 which are separated by a knife edge 29 and a pair of output ports 30. The pickoff technique takes advantage of the plane of gas which moves regularly away from exhaust ports 17A of radial passageways 16A. The pickoff uses knife edge 29 to control a mass of gas flowing from an input port 31 to output ports 30. A misalignment between case 10A and rotor 13A causes a disproportionate mass flow in control ports 28, the disproportionate flow in control ports 28 causing a further disproportionate flow of the mass of gas from input port 31 to output ports 30. The amplified output is thus derived at output ports 30. The output from ports 30 can be applied to any fluid logic control system (not shown). A typical fluid amplifier which could be employed is the DOFL type fluid amplifier as described in Diamond Ordnance Fuze Laboratories, ASME proceedings on "Fluid Jet Amplifiers," 1962.

While we have described above the principles of our invention in connection with specific apparatus, it is to be clearly understood that the specification is presented by way of example and not as a limitation as a scope of our invention, as set forth in the accompanying claims.

We claim:

1. In a pneumatically operated gyroscope, a bearing support having an outer bearing surface of spherical contour, two series of ports in said bearing support, the portion of said ports adjacent said outer bearing support surface being disposed in planes normal to the axis of said support, means to exhaust gas under pressure through said ports, a rotor having two surface areas of uniform configuration separated by a channel symmetrically positioned with respect thereto, said surface areas being of spherical contour having a radius slightly larger than the radius of the spherical surface of said bearing support to provide a gas bearing gap therebetween, each of said areas being adapted to overlie one of said series of ports so that when gas flows from said ports it spreads out into a thin strata between the opposed bearing surfaces escaping toward said channel and toward the side edges of said rotor, and means on the rotor to exhaust gas from said channel in a manner to propel said rotor.

2. A pneumatically operated gyroscope as defined in claim 1, wherein said means to exhaust gas from said channel in a manner to propel said rotor includes a plurality of radial passageways originating at said channel and terminating at the outer periphery of said rotor in exhaust ports directed substantially tangential to the outer periphery of said rotor.

3. A pneumatically operated gyroscope as defined in claim 1, wherein said outer bearing surface of said bearing support is provided with a circumferential duct adjacent said rotor channel and unconnected with said series of ports in the bearing support except through said gas bearing gap.

4. A pneumatically operated gyroscope according to claim 2, further including a pneumatic pickoff pneumatically coupled to said exhaust ports and to the body of gas forming the bearing in said gas bearing gap and exhausted through said ports to sense any misalignment between said rotor and said bearing support.

5. A pneumatically operated gyroscope according to claim 4, in which said pneumatic pickoff includes a knife edge positioned with respect to said rotor exhaust ports such that it bisects the jet of gas emanating therefrom when said rotor is properly aligned, two control ports arranged on either side of said knife edge to receive gas flowing from said exhaust ports such that an unequal flow of gas enters said control ports when there is a misalignment between said rotor and said support.

6. A pneumatically operated gyroscope according to claim 5, in which said pneumatic pickoff includes an input port coupled to said control ports, means to introduce a pressurized gas to said input port, and two output ports coupled to said input port whereby a disproportionate flow of gas in said control ports causes a disproportionate flow of gas from said input port to said output ports.

7. In a pneumatically operated gyroscope, a support, a rotor concentric with said support having at least one radial passageway terminated in an exhaust port to form a turbine nozzle, means to supply a pressurized gas to said radial passageway for exhaust through said exhaust port as a jet to spin said rotor, and a pneumatic pickoff pneumatically coupled to the jet of gas emanating from said exhaust port to sense misalignment between said rotor and said support, said pneumatic pickoff including a knife edge positioned with respect to said rotor exhaust port such that it bisects the jet of gas emanating therefrom when said rotor is properly aligned, two control ports arranged on either side of said knife edge to receive gas flowing from said exhaust port such that an unequal flow of gas enters said control ports when there is a misalignment between said rotor and said support, said pneumatic pickoff further including an input port coupled to said control ports, means to introduce a pressurized gas to said input port, and two output ports coupled to said input port whereby a disproportionate flow of gas in said control ports causes a disproportionate flow of gas from said input port to said output ports.

8. In a pneumatically operated gyroscope, a source of gas under pressure, a bearing having a generally spherical surface, a rotor concentrically arranged about the bearing and having a generally spherical surface in spaced circumscribing relation to the spherical surface of the bearing to provide a gas bearing gap therebetween, means communicating said gas bearing gap with said source of gas under pressure to provide a layer of gas in said gas bearing gap having a predetermined minimum pressure, an exhaust port on the outer periphery of the rotor directed so that the exhaust of a jet of gas therethrough under pressure will effect rotation of the rotor, means including said gas bearing gap communicating said exhaust port with said source of gas to channel gas through said gas bearing gap and out of said exhaust port, and a pneumatic pickoff pneumatically coupled to the jet of gas emanating from said exhaust port to sense misalignment between the rotor and said bearing, a caging mechanism movable between rotor locking and rotor unlocking positions, means normally resiliently biasing the caging mechanism into rotor locking position when the pressure of gas in said gas bearing gap drops below said predetermined minimum, and means including a gas cylinder and piston responsive to pressure of gas in the gas bearing gap over said predetermined minimum to retain the caging mechanism in said unlocked position.

9. The combination according to claim 8, in which said means normally resiliently biasing the caging mechanism into rotor locking position constitutes a preloaded spring.

10. The combination according to claim 8, in which bearing means are provided carried by the piston and movable into engagement with the rotor when the caging mechanism moves into rotor locking position.

References Cited

UNITED STATES PATENTS

| | | | |
|---|---|---|---|
| 2,293,707 | 8/1942 | Braddon | 33—226.4 |
| 2,474,072 | 6/1949 | Stoner | 74—5.7 |
| 3,187,588 | 6/1965 | Parker | 74—5.6 X |
| 3,252,340 | 5/1966 | Watt | 74—5.6 X |
| 3,311,987 | 4/1967 | Blazek | 33—204.2 |
| 3,320,816 | 5/1967 | Johnston | 74—5.7 X |

FRED C. MATTERN, JR., *Primary Examiner.*

F. D. SHOEMAKER, *Assistant Examiner.*

U.S. Cl. X.R.

74—5.43, 5.6